F. J. BANK.
WORK HOLDER.
APPLICATION FILED JUNE 18, 1918.
1,291,719.
Patented Jan. 21, 1919.
2 SHEETS—SHEET 1.
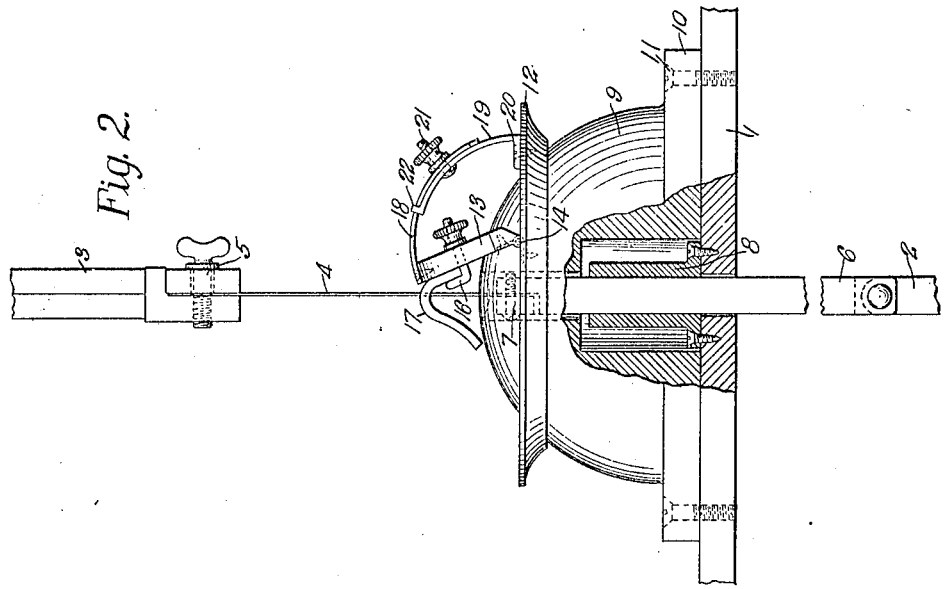
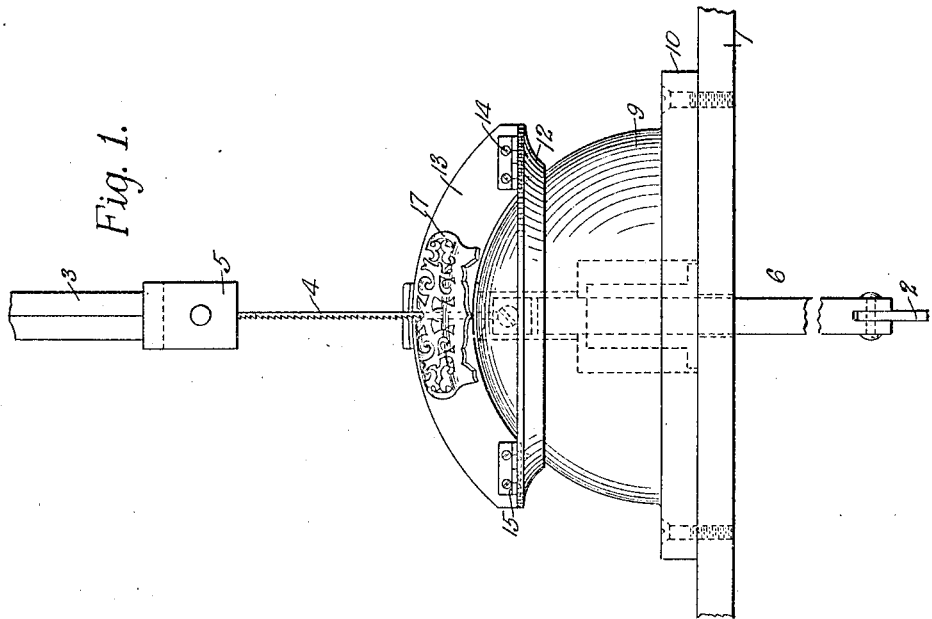
WITNESSES
Arthur Frisch
A. L. Kitchin
INVENTOR
Francis J. Bank
BY
ATTORNEYS F. J. BANK.
WORK HOLDER.
APPLICATION FILED JUNE 18, 1918.
1,291,719.
Patented Jan. 21, 1919.
2 SHEETS—SHEET 2.
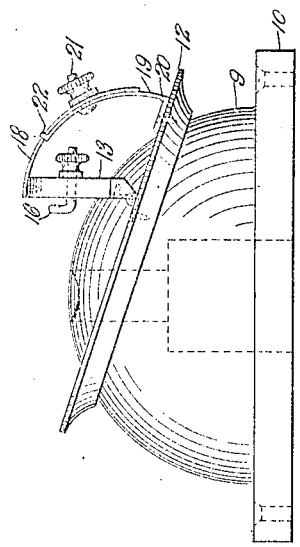
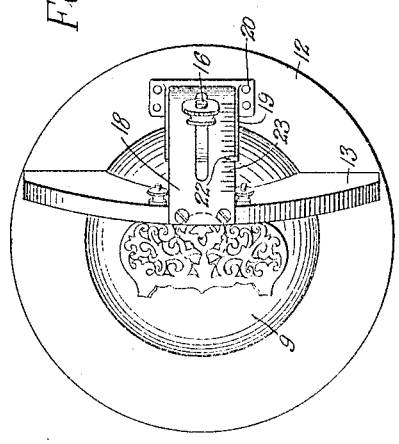
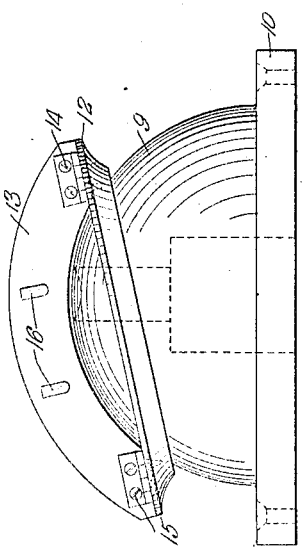
WITNESSES
Arthur Orisch
A. L. Kitchin.
INVENTOR
Francis J. Bank
BY Wm & Co.
ATTORNEYS

UNITED STATES PATENT OFFICE.

FRANCIS J. BANK, OF NEW YORK, N. Y.

WORK-HOLDER.

1,291,719.	Specification of Letters Patent.	Patented Jan. 21, 1919.

Application filed June 18, 1918. Serial No. 240,671.

*To all whom it may concern:*

Be it known that I, FRANCIS J. BANK, a citizen of the United States, and a resident of the city of New York, borough of Manhattan, in the county and State of New York, have invented a new and Improved Work-Holder, of which the following is a full, clear, and exact description.

This invention relates to work holding devices in the wood working art and has for an object the provision of an improved construction for holding an article of any shape so that a saw may pass therethrough substantially at any angle to any plane of the article.

Another object in view is to provide an improved holding device for scroll saws whereby shaped or flat circular moldings may be cut so as to present an ornament for ornamental stands and other objects, where scroll work is desirable or necessary.

A still further object of the invention is a holder for work in connection with the scroll saw in which a loosely mounted ring is positioned on a sphere or half-sphere with a clamping member for carrying the work so that in shifting the work the ring is moved.

In the accompanying drawings:

Figure 1 is a side view of part of a scroll saw with an embodiment of the invention shown in connection therewith.

Fig. 2 is an edge view of the structure shown in Fig. 1, certain parts being broken away for better illustrating certain of the construction.

Fig. 3 is a top plan view of the device embodying the invention.

Fig. 4 is a front view of the device shown in Fig. 3.

Fig. 5 is a side view of the device shown in Fig. 3.

Referring to the accompanying drawings by numerals 1 indicates a table of an ordinary scroll saw which may be manually operated or may be operated by power. As is usual with scroll saws a lower rod 2 is provided and an upper rod 3. The upper rod 3 has the saw 4 secured thereto by a suitable clamping structure 5, while link 6 is connected to saw 4 and pivotally connected to rod 2 by a suitable clamp 7. The link 6 extends loosely through table 1, but slidingly fits in the guide 8 which is rigidly secured to table 1 by any suitable means, as for instance screws. Mounted upon the table 1 is a half-sphere 9 which is provided with a flange 10, said flange being either formed separate and rigidly secured to the half-sphere 9 or formed integral therewith, said flange acting as means for receiving the clamping screws 11 for holding the half-sphere 9 in engagement with table 1. Loosely mounted upon the half-sphere 9 is a ring 12 which may be moved over the half-sphere in any desired direction as shown in Figs. 4 and 5. A pivotally mounted work carrying bracket 13 is connected with the ring 12 by suitable hinges 14 and 15, said bracket carrying one or more clamping hooks 16. By this form of clamping structure the work 17 may be clamped firmly against the bracket. An adjusting slotted strip 18 is rigidly secured to the outer edge of the bracket 13, which bracket is arc-shaped as shown in Fig. 1, said strip slidingly fitting against the slotted strip 19 rigidly secured at 20 to ring 12. A clamping bolt 21 extends through the slots in the sliding strips 18 and 19 as shown in Figs. 2 and 3 whereby the bracket 13 is clamped at any desired angle in respect to the upper surface of the ring 12. In order to secure any angle a number of times a projection 22 is provided in the strip 19, said projection being sharpened and acting as a pointer as it moves over the graduations 23 on strip 18. By this means when any particular piece of work 17 is operated upon and then the device is used for some other shape a second article similar to article 17 may be operated on in exactly the same manner as the slant of the bracket 13 may be secured by making a memorandum of the numbering of the particular graduations indicated by the pointer 22.

By this construction and arrangement the saw member 4 cuts in a direction radially from the center of the half-sphere 9 and thereby produces a substantially parallel wall when the walls are near together, though in reality the walls slightly converge toward the center of the half-sphere 9. This arrangement is especially desirable where scroll work is to be formed on circular moldings. If desired the sphere 9 may be as large as the base of the stand, though ordinarily this is not necessary as the molding is formed in sections and each section independently sawed.

In the drawing a peculiar curved molding is shown which is one section of a circular molding, but it will be understood that flat or other shaped articles could be sawed in a similar manner to the particular article shown without departing from the spirit of the invention. The article itself is not grasped by the hands of the operator, but the ring 12 is grasped and the article moved around so that the walls of any particular sawed out portion are substantially parallel though if accurately measured they would be substantially radial from the center of the half-sphere 9.

What I claim is:

1. A work holder comprising a rounded support, a manually operated member resting on said support and movable thereover, one surface of said member conforming substantially to the shape of said support, and means for clamping a piece of work to said manually operated member.

2. A work holder for scroll saws comprising a rounded support, a ring loosely mounted on said support, and means for clamping a piece of work on said ring.

3. A work holder for scroll saws comprising a rounded support having an opening through which the saw may pass, a ring loosely fitting on said support, said ring being of less diameter than the support, and an adjustable clamping means for clamping an article on said ring.

4. A work holder for scroll saws comprising a rounded support provided with an opening for a saw, a ring loosely mounted on said support of considerably less diameter than the center of the rounded part of the support, a bracket hinged to said ring, a clamping member for clamping an article to said bracket, and an adjustable structure for holding said bracket at any desired angle in respect to the surface of said ring.

5. A work support for scroll saws comprising a rounded supporting member having an opening for a saw, a ring loosely mounted on said support, an arc-shaped bracket hinged at its ends to said ring so as to partly straddle said rounded support, an adjustable brace for said bracket for holding the same at any desired angle in respect to the upper surface of the ring, and means for clamping an article to said bracket.

6. A work support for scroll saws comprising a rounded supporting member having an opening for a saw, a ring loosely mounted on said supporting member, a bracket hinged to said ring, means on the bracket for clamping a piece of work thereto, a pair of sliding strips, one of said strips being rigidly secured to said bracket and the other rigidly secured to said ring, and a clamping member for clamping said strips together in any adjusted position for locking the bracket at any desired angle in respect to the upper face of said ring.

7. A work support for scroll saws comprising a rounded supporting member having an opening through which a saw is adapted to pass, a ring loosely mounted on the rounded supporting member and adapted to slide thereover, and means for connecting a piece of work to said ring.

FRANCIS J. BANK.

Copies of this patent may be obtained for five cents each, by addressing the "Commissioner of Patents, Washington, D. C."